United States Patent [19]

Phillips

[11] Patent Number: 4,775,180
[45] Date of Patent: Oct. 4, 1988

[54] AUTOMATIC RETRACTABLE SHADE

[76] Inventor: Arthur J. Phillips, 492 Morrison St., Carbondale, Colo. 81623

[21] Appl. No.: 119,196

[22] Filed: Nov. 10, 1987

[51] Int. Cl.[4] .............................................. B60J 3/00
[52] U.S. Cl. .................................. 160/84.1; 296/138; 296/97.7; 296/97.8; 160/370.2
[58] Field of Search ................ 296/97 G, 97 R, 97 D, 296/138, 142, 143; 160/84.1

[56] References Cited

U.S. PATENT DOCUMENTS

| | | | |
|---|---|---|---|
| 289,573 | 12/1883 | Scott | 160/84.1 |
| 1,168,343 | 1/1916 | Smith | 296/141 |
| 1,289,281 | 12/1918 | Shaft | 160/84.1 |
| 1,409,451 | 3/1922 | Jaeger | 296/139 |
| 1,648,994 | 11/1927 | Pitman | 296/97 G |
| 2,723,714 | 11/1955 | Moore | 160/23 |
| 2,874,612 | 2/1959 | Luboshez | 160/84.1 |
| 3,913,655 | 10/1975 | Ogino | 160/84 R |
| 4,205,816 | 6/1980 | Yu | 248/266 |
| 4,442,881 | 4/1984 | Monteath et al. | 296/97 D |
| 4,560,245 | 12/1985 | Sarver | 296/95 C |
| 4,647,102 | 3/1987 | Ebrahimzadeh | 296/97 D |

Primary Examiner—Robert R. Song
Attorney, Agent, or Firm—Norvell E. Von Behren

[57] ABSTRACT

An automatic retractable shade unit for an automotive vehicle. The unit uses a pleated shade section with a solar reflective coating on at least the outside facing portion of the shade. A thin mounting case is used to removably mount the case in close proximity to nonparallel side posts of the automotive vehicle. A spring bias in combination with retractable cord means allows the shade to be opened and closed against the bias of the spring. The removable fastener mountings used with the invention permit the entire unit to be removed from the front windshield of the vehicle and to be repositioned on another window in the vehicle as desired. The pleated shade section may be closed over the windshield to allow the bottom of the shade to expand more than the top because of the nonparallel sides. The novel construction and positioning of the applicant's shade unit provides a device that has the advantage of quickness and ease of use over prior art devices. As such, the driver of the automotive vehicle is more apt to use the novel shade unit on a regular and routine basis thereby further protecting the vehicle's interior.

20 Claims, 3 Drawing Sheets

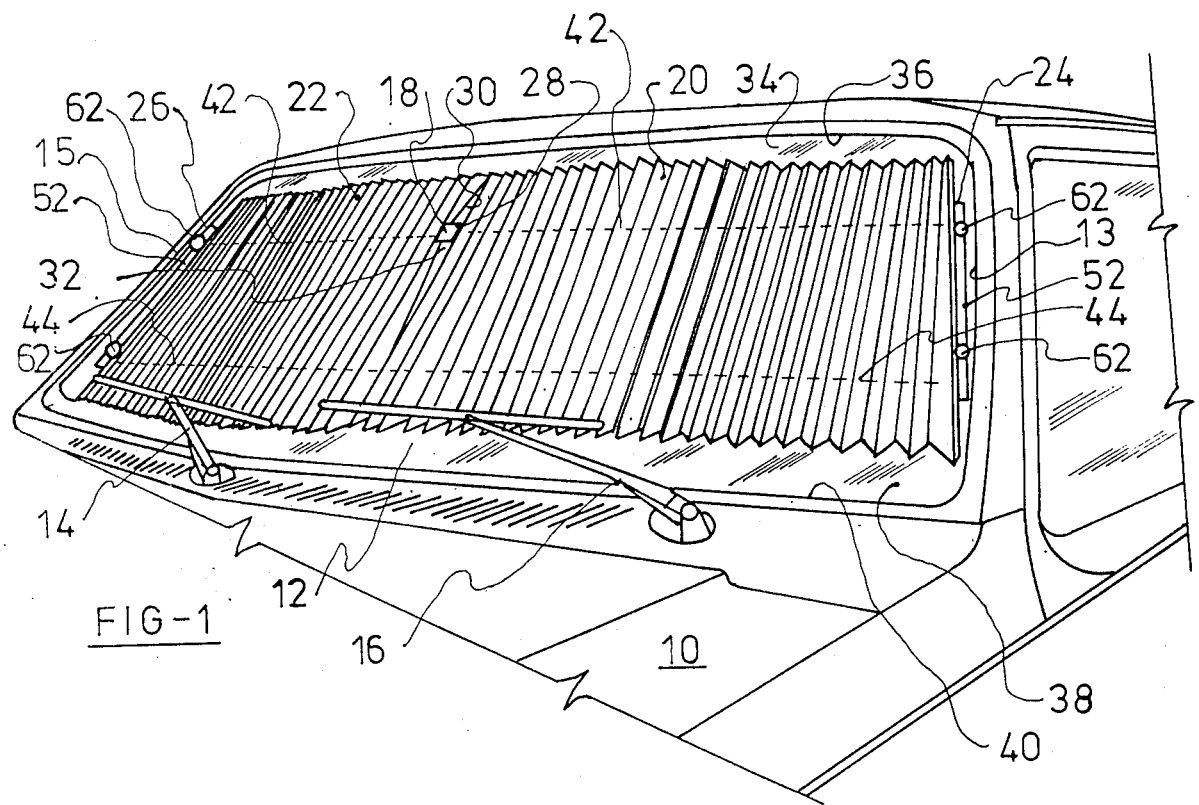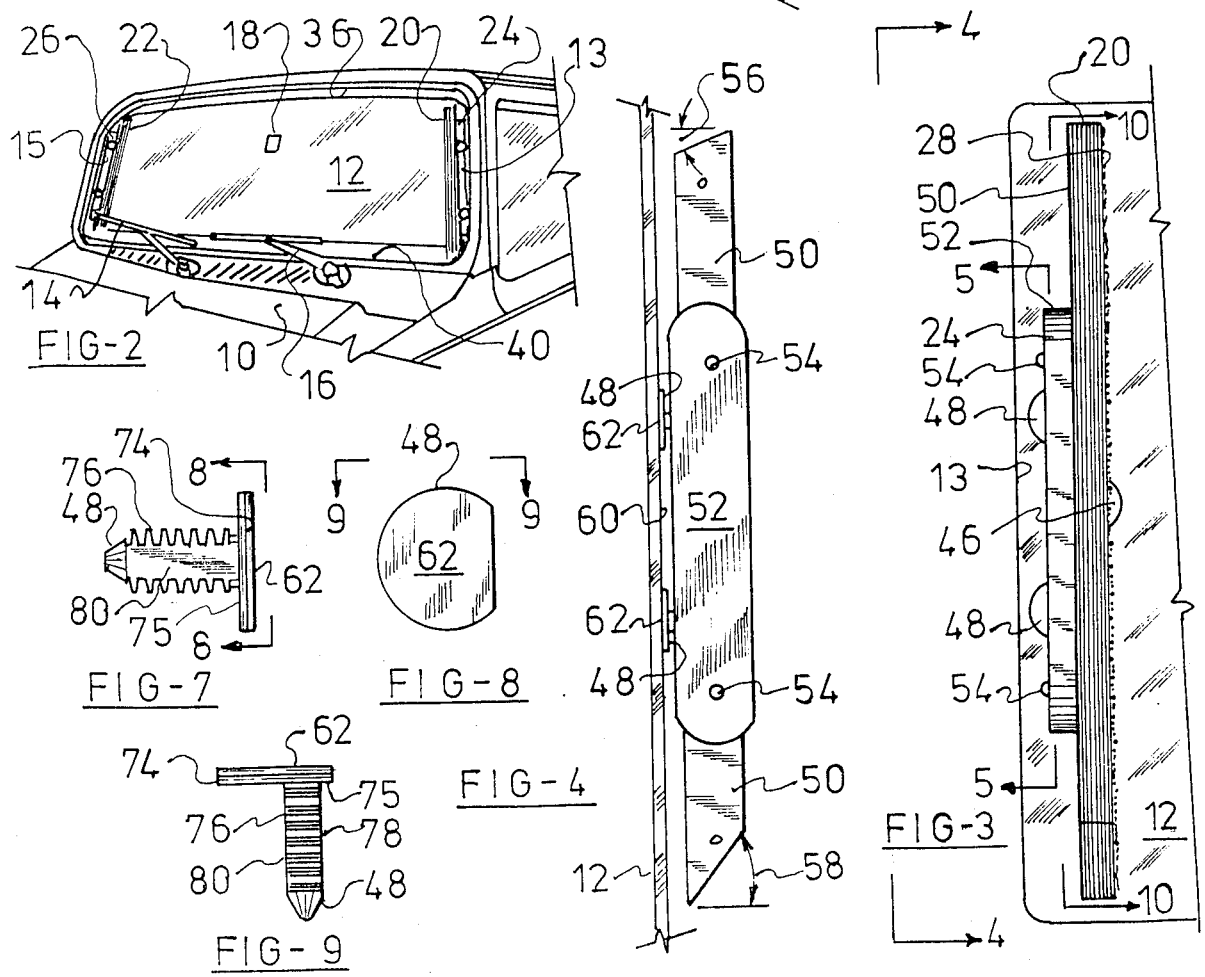

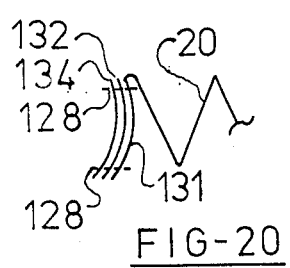
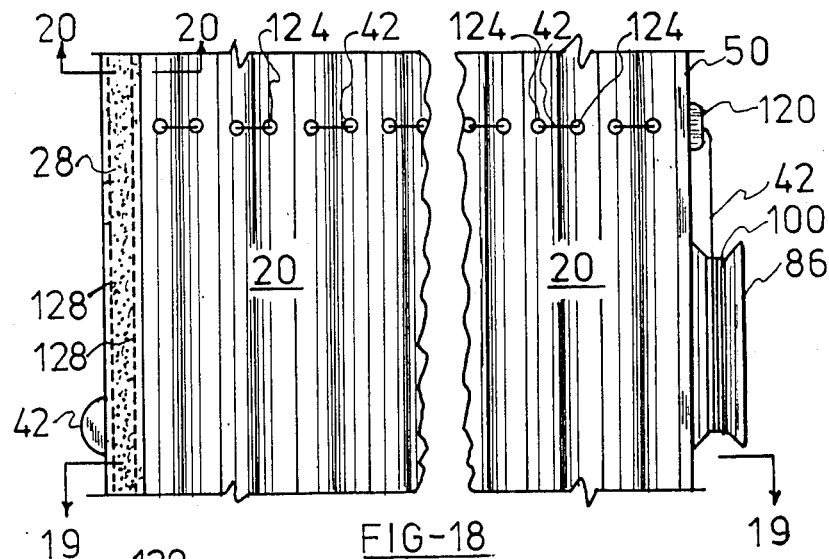
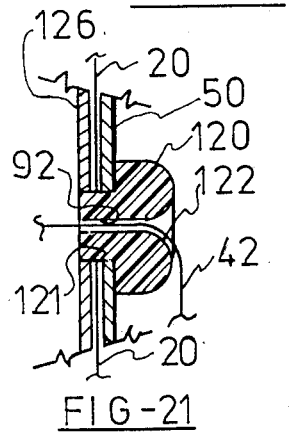
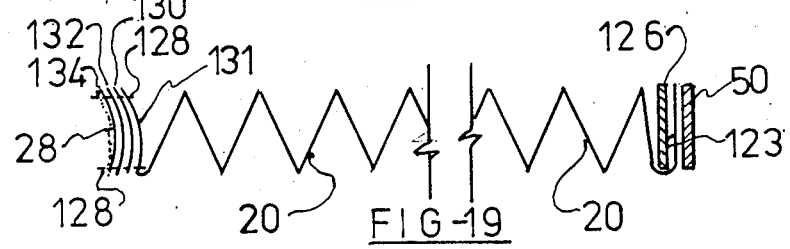
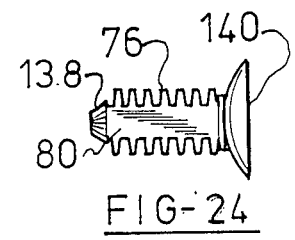
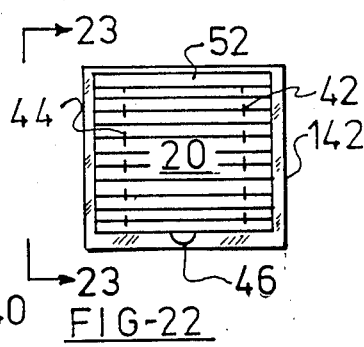
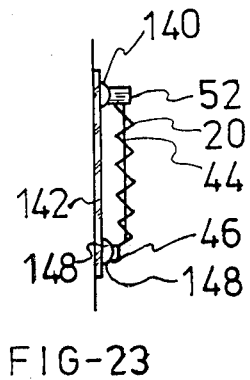
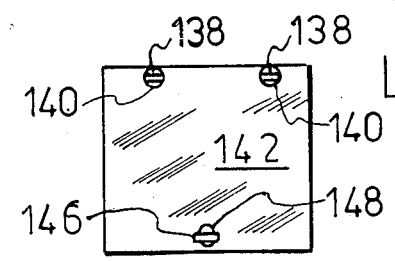
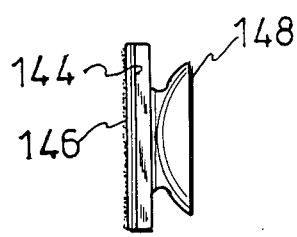

AUTOMATIC RETRACTABLE SHADE

BACKGROUND OF THE INVENTION

This invention relates generally to an automatic retractable shade and more particularly to a new and novel shade unit for use in automobiles to protect the inside of a parked automobile from the deleterious effect of solar radiation, with the unit also being adaptable to other uses in the automobile during its operation.

It is known that solar heat buildup in a closed automotive vehicle can cause the inside of the vehicle to reach extremely high temperatures. This heat buildup places a heavy load on the vehicle's air conditioner and is very uncomfortable to occupants as they enter the closed vehicle.

Solar damage from ultraviolet light coming through the windshield also causes damage to the dashboard and can destroy plastic and fabric most often used in a vehicle. Once the vehicle is being operated, the heat buildup can usually be removed by the vehicle's air conditioner or by opening the vehicle's side windows.

However another problem then becomes readily apparent. On long trips in a vehicle with children or other adults in addition to the driver, the solar radiation may also be undesirable through the vehicle's side windows, especially when the vehicle is traveling north or south in the early mornings and late afternoon.

Various devices have been tried in the past with some degree of success. The modern trend is to use a folded or pleated piece of cardboard which is positioned on the inside of the front windshield of the vehicle and leans on the dashboard, being held at the top by the vehicle's sun visors. Because of the many various sizes and shapes of windshields, this solution is only partly effective since the cardboard is usually only made in one size. In addition, the cardboard does not generally reflect solar heat but instead tends to absorb it causing additional heat transfer by conduction.

Another problem with the cardboard device is the large unprotected side areas of the windshield caused by nonparallel windshield posts. Most modern vehicle windshields are constructed in an isosceles trapezoid shape with equal length nonparallel sides and unequal length parallel top and bottom edges. Such a shape requires an acceptable device to be able to conform to the shape without extensive complicated mounting brackets.

The problem of side window solar radiation while the vehicle is being operated is oftentimes minimized by hanging a towel or large handkerchief along the window after opening the window and positioning the top of the handkerchief in the closed window. Some solar radiation is blocked by this method but the solution also is aesthetically unappealing.

Various window shade devices are known in the art as typified by the U.S. Pat. No. 289,573, to W. C. Scott, issued on Dec. 4, 1883. This device is simply a pleated window shade with a pull cord to raise and lower the shade in the window. A modified type window shade is taught in the U.S. Pat. No. 1,289,281, to W. S. Shaft, issued on Dec. 31, 1918. This pleated window shade is adjustable by cords at the top and bottom to various positions on the window. The modification of these window shades to an automotive vehicle would result in a device which would be very cumbersome to operate, especially where two shades were mounted on opposite sides of the windshield.

A temporary curtain for covering a home window is taught in the U.S. Pat. No. 3,913,655, issued on Oct. 21, 1975. This device is a pleated paper drapery that is used temporarily by a new homeowner or renter until he can purchase the more expensive pre-made fabric materials. This device, while satisfactory for its intended use, would not be acceptable for use on an automotive windshied since no spring bias retraction device is incorporated which would result in cumbersome and bulky ties being needed to hold the device in an open position which would not obstruct the driver's normal vision while operating the vehicle.

Various spring biased mounting devices are known for use with home window shades as typified by the U.S. Pat. No. 4,205,816, to C. L. Yu, issued on June 3, 1980. Mounting such a device parallel to an angled windshield post would cause the shade to come out of the roller at an angle to the vehicle's dashboard. In order to compensate, the roller must be mounted perpendicular to the dashboard which would require bulky mounting brackets that would cause vision obstruction to the driver.

Side curtains or shades have been used in older automobiles of the early vintage type having no side windows. One typical side shade is taught in the U.S. Pat. No. 1,168,343, to E. Smith, issued on Jan. 18, 1916. This curtain is a pleated device with transparent panels 19 which are designed to presumably prevent rain, snow or air from entering the open sides of the vehicle while it is being operated. The curtain is pulled along a wire 14 or cable and is swung upwardly to clear the door space when not used. The transparent panels 19 would admit solar radiation and as such this device would not be acceptable as a windshield cover. Other problems with this device also make it unacceptable to solve the before mentioned problems.

Another type of side curtain or shade is taught in the U.S. Pat. No. 1,409,541, to E. R. Jaeger, issued Mar. 14, 1922. The device uses a pleated shade which moves on vertical rods and would be impossible to adapt to a front windshield. Transparent slits 23 or sections are designed to let in light which would negate their use on a front windshield to prevent the effects of solar radiation.

A horizontally mounted roller glare shield for use on a vehicle windshield is taught in the U.S. Pat. No. 1,648,994, issued to E. F. Pitman on Nov. 15, 1927. A semitransparent curtain is used and is held in an open position by a vacuum cup 11. To adapt this device to a modern automotive vehicle would expose a major portion of the dashboard to solar radiation since a modern vehicle generally has an outwardly sloped windshield at the bottom thereof. The patented device would be usable on a vintage automobile with a generally vertical windshield but could not be easily adapted to a sloped windshield.

A detachably outside mounted protective curtain for windshields to prevent accumulation of ice, snow or frost is taught in the U.S. Pat. No. 2,723,714, issued to M. R. Moore on Nov. 15, 1955. A conventional window shade roller with a plastic planar surface on the curtain functions as designed but could not be adapted for inside mounted solar radiation prevention on nonparallel side post windshields of modern construction as previously discussed.

A modern device to attempt to solve the solar radiation problem is taught in the U.S. Pat. No. 4,560,245, issued on Dec. 24, 1985, to P. I. Sarver. This device is an internally positioned heat transfer inhibiting curtain that is positioned folded on the dashboard when not used and is lifted upwardly when in use, being held by fastener strips 28 and 30 of the knit loop and hook type commonly known as Velcro brand types. This device will partially or totally obstruct the vehicle's defroster vents on the top of the dashboard. Should the vehicle windshield quickly fog up, as often happens while being driven, a dangerous situation would present itself as the driver tries to remove the device to allow the defroster vents to operate. Also referred to in this patent is a completely removable curtain that is externally stored. U.S. Pat. No. 4,109,957 apparently is a device for solar radiation prevention which is constructed of cloth material to reduce solar radiation.

The effectiveness of any device to protect against solar radiation is only as good as the person who uses the device. The simplicity of any device may be useful in getting the driver to discipline himself or herself to position the device every time one leaves the vehicle. The modern folded cardboard devices can often be seen lying on the back seat of the vehicle after the driver has left without the device being positioned in the windshield area, thus destroying the effectiveness of the device.

The best device would then be one that can be closed in place across the windshield, quickly and with very little effort and one that can also be opened quickly without effort so that its use is as simple as the buckling of a seat belt. Such a device would then be used more often by the driver and accordingly the interior of the vehicle would be better protected.

SUMMARY OF THE INVENTION

In order to overcome problems inherent in prior art devices that would prevent their adaptation to modern automotive vehicles, there is provided by the subject invention a new and novel automatic retractable shade unit which is removably mounted near the inside of a nonparallel-sided windshield post, but does not restrict the driver's vision. The novel device is formed with a pleated shade section having a solar reflective material formed on the outside facing surface.

The pleated shade section in combination with the novel mounting case permits the applicant's novel shade unit to be closely mounted to the nonparallel even length sides of the automotive windshield. The pleated section thereby may be closed over the windshield to allow the bottom of the shade to expand more than the top because of the nonparallel sides.

The pleated shade section is also spring biased to return the section to an open position while the automotive vehicle is being operated. Fastening means in the form of a loop and hook fastener or a suction cup permit the shade to be held closed to an adjacent surface while mounting means are provided on the case to removably mount the case so that it may be moved to another location and used while the vehicle is being operated.

Accordingly an object and advantage of the invention is to provide a new and novel retractable solar shade that may be mounted, without extensive mounting devices, on the non-parallel side edges of a modern automotive vehicle.

Another object and advantage of the invention is to provide a new and nove solar shade that is capable of being mounted in a way that causes minimal obstruction of the driver's vision with the shade being capable of covering a major portion of the automotive windshield.

Yet another object and advantage of the invention is to provide a new and novel solar windshield shade that may be removably mounted on the front windshield of the vehicle and then may also be moved to a side or rear window of the vehicle while the vehicle is in operation.

Still yet another object and advantage of the invention is to provide a new and novel retractable solar shade for an automotive vehicle which is compact and relatively economical, yet functions to prevent solar radiation into the front windshield of the automobile while it is parked and may also be removed from the front windshield and remounted on a side or rear window to perform the same function while the automotive vehicle is being operated.

Another important object and advantage of the invention is to provide a new and novel solar windshield shade that may be quickly and easily positioned across the windshield of a vehicle with very little or minimal effort on the driver's part, thereby encouraging the driver to use the shade more, thus maximizing the protection to the vehicle's interior.

These and other objects and advantages will become apparent from a study of the Drawings and from a reading of the Description of the Preferred Embodiment hereinafter.

BRIEF DESCRIPTION OF THE DRAWINGS

FIG. 1 is a perspective view of the applicant's novel automatic retractable shade closed and mounted on the inside of a truck windshield.

FIG. 2 is a view similar to FIG. 1 showing the novel automatic retractable shade open.

FIG. 3 is an elevational view looking from inside the truck on the driver's side and showing the applicant's shade mounted on the inside of the truck windshield 12.

FIG. 4 is a cross-sectional view, taken along line 4—4 of FIG. 3.

FIG. 7 is an elevational view of the mounting fastener used with the applicant's shade.

FIG. 8 is an elevational view, taken along line 8—8 of FIG. 7.

FIG. 9 is a plan view, taken along line 9—9 of FIG. 8.

FIG. 18 is a partial elevational view taken along line 18—18 of FIG. 10 showing one of the applicant's automatic retractable shades showing the shade opened and showing in more detail the construction of the novel shade.

FIG. 19 is a cross sectional view, taken along line 19—19 of FIG. 18.

FIG. 20 is a cross sectional view, taken along line 20—20 of FIG. 18.

FIG. 21 is a cross sectional view, taken along line 21—21 of FIG. 16.

FIG. 22 is an elevational view of a side window of the truck of FIG. 1 showing the applicant's novel shade mounted on the side window. FIG. 22 is also representative of the use of applicant's novel shade on any vertical window such as a house window or the like.

FIG. 23 is an elevational view, taken along line 23—23 of FIG. 22.

FIG. 24 is an elevational view of a modified mounting fastener used when the applicant's shade is mounted on a side window of an automotive vehicle as shown in FIG. 22.

FIG. 25 is an elevational view of the side window of FIG. 22 showing the modified mounting fasteners of FIG. 24 positioned to receive the applicant's novel shade.

FIG. 26 is an elevational view of a modified mounting fastener used to hold the shade in a closed position on a side or rear window of the automotive vehicle.

DESCRIPTION OF THE PREFERRED EMBODIMENT

Figure 5:
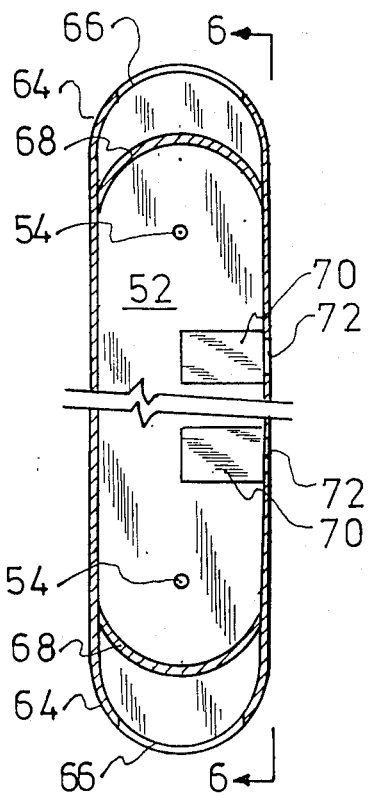
FIG. 5 is a cross-sectional view, taken along line 5—5 of FIG. 3.

Referring to the drawings in general and in particular to FIG. 1 of the drawings there is shown an automotive vehicle 10 having a front windshield 12 with nonparallel side windshield posts 13 and 15. A pair of windshield wipers 14 and 16 are usually positioned on the outside of the windshield 12 and in some automotive vehicles, a rear view mirror is mounted at 18 on the inside of the windshield 12.

The applicant's novel automatic retractable shade unit would be removably mounted on the inside of the windshield 12 in close proximity to the nonparallel side posts 13 and 15. When the automotive vehicle 10 has a window mounted rear-view mirror at 18 then a left-hand shade 20 (looking from the inside) and a right-hand shade 22 would be mounted as shown in FIG. 1. If the rear-view mirror of the vehicle were mounted on the dashboard or above the window, then only one shade unit need be used to extend entirely acorss the inside of the windshield 12.

When two shade units are purchased such as shown in FIG. 1, then the left-hand shade 20 would be fixedly attached, on one side thereof, to its left-hand case 24 while the right-hand shade 22 would be fixedly attached, on one side thereof, to its right-hand case 26. The oppositely positioned shades 20 and 22 would be removably held together, around the inside mirror by loop and hook fasteners 28 and 30 of the type known as the Velcro brand.

Because the shades 20 and 22 are formed in a pleated construction they are easily positioned at 32 around the inside mirror. In FIG. 1, the space 34 above the shades, between the shades and the upper window trim 36, and the space 38 below the shades and the lower trim 40 has been shown exaggerated for purposes of illustration.

The applicant's novel shades would be designed so that the spaces 34 and 38 are covered as much as possible so as to minimize solar radiation entering the automotive vehicle. Accordingly the vertical height of the shades 20 and 22 will be fixed by the height of the windshield and will vary according to the type of windshield and how many size variations are to be manufactured and sold.

The applicant's novel shades are spring biased, as will be later described, and are retractable by the spring bias by retractable means in the form of an upper nylon cord 42 and a lower nylon cord 44 positioned within holes (not numbered) contained within the pleats of the shades 20 and 22. In the preferred embodiment at least two nylon cords are used and it is within the spirit and scope of the invention that more or less may also be used.

Referring now to FIGS. 1 and 2 it can be seen that in FIG. 1 the novel shade device is in a closed position to shade the vehicle's interior from solar radiation while FIG. 2 is a similar view showing the shades open as they may be while the vehicle is being operated. Because of the unique construction of the mounting cases 24 and 26, it can be seen in FIG. 2 how the applicant's device can be closely mounted to the nonparallel side posts 13 and 15 as used in modern automotive vehicles, thereby minimizing any obstruction of the driver's view while operating the vehicle. In addition the unique construction makes the device aesthetically attractive since it can hardly be seen when mounted as shown in FIG. 2.

Polyester monofilament cords 42 and 44 may also be desirable in place of nylon cords. A polyester monofilament cord should wear well in direct sunlight and thus improve the overall quality of the novel shade.

Referring now to FIG. 3 there is shown an elevational view looking from inside the automotive vehicle on the driver's side and showing the left-hand case 24 removably mounted on the inside of the windshield 12 in close proximity to the side post 13. A leather or plastic pull tab 46 is used to pull the shade closed and a pair of mounting fasteners 48 are used to hold the case 24 in place on the windshield surface. The mounting fasteners are fixedly attached to the windshield surface as will be more fully described later when referring to FIGS. 7–9 and permit the case 24 and the oppositely mounted case 26 to be removed from the windshield to clean the inside of the windshield and also to mount the shade unit elsewhere in the vehicle while it is being operated. The fasteners 48 remain attached to the windshield 12.

The left-hand case 24 and the right-hand case 26 are similarly constructed in two pieces with an upper case 50 being positioned on a lower case 52, being held together by a pair of screws 54 as can be seen in FIG. 4. Contained within the lower case 52 are the spring bias means for biasing the shade to return to its open position as will be explained more fully hereinafter. The upper case 50 as well as the pleated shades 20 and 22 may be cut at an angle 56 at the top thereof and at an angle 58 at the bottom thereof to make the shade conform to the particular automotive vehicle interior and to permit the shades to be positioned as close as possible to the upper window trim 36 and the lower window trim 38 to maximize the solar reflection by the shade and to minimize transmittal of solar radiation into the vehicle 10.

The positioning of the case with the shade attached as shown and described makes the applicant's novel device easily accessible to the driver's use and hence insures that he will use it on a regular routine basis since it can be easily and quickly closed across the windshied and can also be quickly and easily opened when the driver returns to the vehicle.

Because of the unique compactness of the applicant's device with the use of the pleated shades and the novel mounting fastener 48, the unit may be closely positioned to the inside surface 60 of the windshield 12, also maximizing the solar reflectivity of the novel device. The mounting fasteners 48 are fixedly held to the inside surface 60 of the windshield 12 by double-sided adhesive tape at 62 or in the alternate may be held thereto by adhesive of the type commonly used to fix rearview mirrors onto the surface of the windshield.

Referring now to FIG. 5 of the drawings it can be seen that the lower case 52 is constructed with rounded ends 64 having slots 66 designed to receive the upper case 50. An inner wall 68 is positioned therein to help contain the internal spools 86 used in the spring bias of the shade as will be described hereinafter. A raised inner surface 70 is positioned adjacent the two holes 72 which function in conjunction with the mounting fasteners 48.

Figure 6:
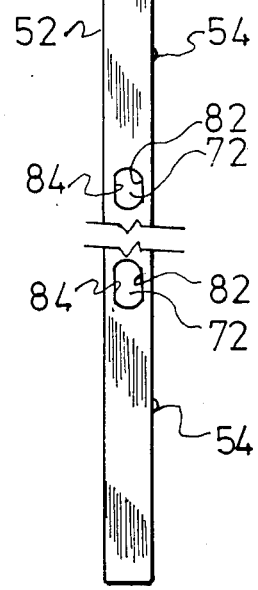
FIG. 6 is an elevational view, taken along line 6—6 of FIG. 5.

Referring now to FIG. 6 of the drawing it can be seen how the lower case 52 is constructed relatively narrow which aids in minimizing view obstruction of the driver because the case 52 can thereby be closely positioned to the windshield side posts 13 or 15. It can also be seen in FIG. 6 how the holes 72 are formed with parallel flat surfaces 82 and 84 functioning as will be described hereinafter.

Referring now to FIGS. 7-9 there will now be described the mounting fasteners 48 and how they are positioned within the lower case 52 to hold the case tightly onto the inside surface 60 of the windshield 12. The fasteners 48 would be constructed of a semisoft, unbreakable nylon or plastic material in the form shown in FIGS. 7-9 with a flat surface 74 on which is positioned the double-sided tape or adhesive 62. Formed on the underside 75 of the flat surface 74 are a plurality of protrusions 76 having parallel flat surfaces 78 and 80 which are positioned within the flat surfaces 82 and 84 of the lower case 52 shown in FIG. 6.

The protrusions 76 and flat surfaces 78 would be sized to allow the mounting fastener to be tightly positioned within the holes 72 with the raised surfaces 70 bearing therein for added stability. When it was desired, the entire shade device could be removed from the mounting fasteners 48 which would remain tightly positioned on the inside surface 60 of the windshield 12.

Figure 10:
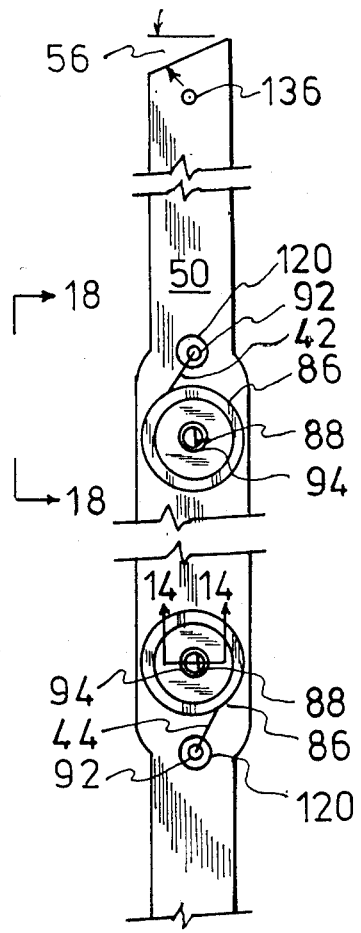
FIG. 10 is an elevational view, taken along line 10—10 of FIG. 3 showing a portion of the retracting mechanism for the applicant's shade. For purposes of clarity the lower case 52 has been removed and is not shown in FIG. 10.
Figures 14, 16, 17:
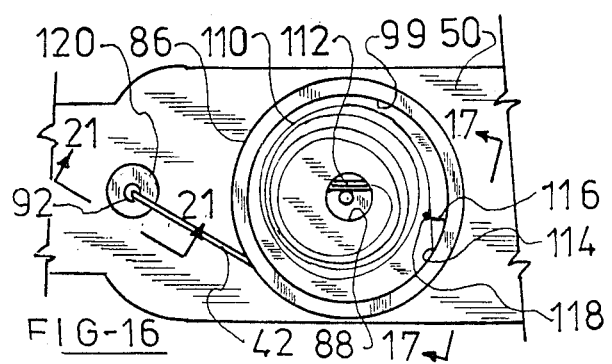
FIG. 14 is a cross-sectional view, taken along line 14—14 of FIG. 10, showing the center pin 88 used in the retracting mechanism of the applicant's device.
FIG. 16 is an enlarged elevational view of one of the spools 86 showing the spring bias means positioned within the spool 86 for retracting the applicant's shade.
FIG. 17 is a cross sectional view, taken along line 17—17 of FIG. 16.

Referring now to FIG. 10 of the drawings there is shown an elevational view, taken along line 10—10 of FIG. 3 showing the lower case 52 removed and showing a portion of the retracting mechanism for the applicant's shade. A pair of spools 86 having center holes 94, formed in the spool's bottom 96, are positioned over center pins 88 which are fixedly attached to the upper case 50 as can be seen in FIG. 14. The cords 42 and 44 forming the retractable means of FIG. 1 are wrapped around the spool 86 and are positioned through a hole 92 in the upper case and in the line guide 120 as shown in FIG. 21.

As has been before mentioned, the more preferable cord construction would be polyester monofilament for longer life and the applicant is not to be bound by the exact constructional details of the invention within the spirit and scope of his invention. The constructional details have been given by way of illustration only.

Figures 11, 12, 13:
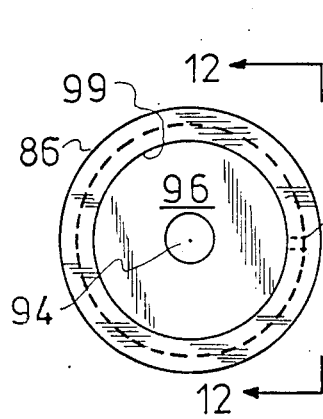
FIG. 11 is an elevational view of the spool 86 used in the retracting mechanism of the applicant's shade.
FIG. 12 is an elevational view, taken along line 12—12 of FIG. 11.
FIG. 13 is an elevational view, taken along line 13—13 of FIG. 12.

Referring now to FIGS. 11-13 of the drawings there will be described in more detail the construction of the spools 86. The spools 86 may be constructed of aluminum or plastic in the preferred embodiment and have formed thereon a flat bottom surface 96 with a center hole 94 to receive the center pin 88 as before described. The spools 86 thereby rotate on the center pins 88 which also function to hold one end of the spring bias as will be described hereinafter.

A sloped rim 98 with a V-shaped groove 100 receives the cords 42 or 44 forming the retractable means of the invention. A single hole 102 is formed in the V-shaped groove as can be seen in FIG. 12. The ends 116 of the cords 42 or 44 are positioned through the holes 102 in the spools 86 to be tied to the outer end 114 of the spring bias 110 as will be described when referring to FIGS. 14-17.

Figure 15:
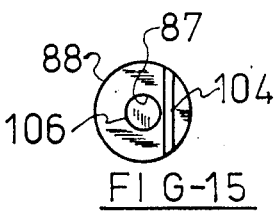
FIG. 15 is a plan view, taken along line 15—15 of FIG. 14.

The mounting of the center pin 88 to the upper case 50 is shown in FIG. 14 which is a cross-sectional view, taken along lines 14—14 of FIG. 10. In a drilled and tapped center hole 106 is positioned a screw 89 which is positioned through a hole 87 in the upper case 50 and the pin 88 to tightly fix the center pin 88 to the upper case 50. A slot 104, shown in FIGS. 14 and 15 is formed in the center pin 88 and receives the inner end 112 of the spring bias 110 in the form of a coiled flat spring bias 110.

Referring now to FIGS. 16 and 17 there will be seen in more detail how the flat coil spring bias 110 is positioned in the inside of the spool 86 within the inner rim 99 and around the center pin 88. The inner end 112 of the coil spring bias 110 is positioned in the slot 104 while the outer end 114 of the spring bears against the inner rim 99 as can be seen in FIG. 16. The end 116 of either the cord 42 or 44 would be positioned through the hole 102 in the particular spool 86 and would then be positioned through a slot or hole formed in the outer end 114 of the spring. This hole is not shown in the drawings and the end 116 of the cords would then be knotted at 118 or fixed to the spring end 114 by other means known in the art.

It can then be seen that whenever the pleated shade 20 or 22 would be closed over the windshield 12 by pulling on the tab 46, the flat coil spring bias 110 would tightly wrap around the center pin 88 as the cords 42 or 44 rotate the spools 86. Upon release of the shade 20 or 22 the bias of the spring 112 would case the spool 86 to rotate in the opposite direction since the end 116 of the cords is fixed to the outer end 114 of the spring 112.

A line guide 120 is positioned in a hole 121 in the upper case 50 and the shades 20 or 22 as well as in the second part 126 of the upper case as shown more clearly in FIG. 21. The line guide 120 may be constructed of ceramic, nylon or plastic within the spirit and scope of the invention and serves to guide the cords 42 or 44 as well as to prevent wear damage on the cords as they reverse direction in the area shown by the numeral 122.

Referring now to FIGS. 18-20 there will be described in more detail a preferred mounting of the shades 20 or 22 to the upper case 50 and the mounting of the shades to stiffeners on the other end thereof. The upper case 50 would preferably be constructed in two parts 50 and 126 so that the ends 123 of the shades could be juxtaposed there between as shown in FIG. 19 being tightly held therein by the screws 136 shown more clearly in FIG. 10.

As has been before mentioned, the holes through which the cords 42 and 44 are positioned have been left unnumbered in earlier views for purposes of clarity. However there is shown in the enlarged partial elevational view a section of the pleated shades and the holes are shown enlarged and are numbered 124. FIG. 18 also shows in more detail how the cord 42 would be positioned through the holes 124 and through the line guide 120 and would be wrapped several times around the spool 86 in the V-shaped groove 100. The end 116 of the cord would then be posltioned through the single hole 102 of the spool 86 and would be tied to the end 114 of the spring bias 110 as has before been described.

In order to permit the pleated shades 20 and 22 to be pulled closed against the force of the spring bias, there is provided a plurality of stiffener sections 130, 132 and 134 between the parallel cords 42 and 44 on the end 131 of the shade. The stiffener sections 130, 132 and 134 may be formed of flexible plastic or steel having a thickness of approximately 0.010" and would be sewn along the sewn lines 128 shown dashed in FIG. 18. In this manner the center section of the pleated shade end 131, between the cords 42 and 44, would be reinforced to allow the shade to be closed across the windshield 12.

One or two of the stiffener sections 132 and/or 134 may be extended to the top and bottom of the shade end 131 and sewn thereto at 128 as desired. When using the relatively thin shade stiffeners 130, 132 and 134 sewn together and to the end 131 of the shades 20 or 22, the shade end is able to be bent around an internal rear-view mirror as shown in FIG. 1 to tightly position the shade stiffener sections together to avoid solar radiation in this area. The tabs 46 would also be sewn into the stiffener sections as would be the cords 42 and 44. In actual construction when using two spoos 86 as shown in the drawings, the cord could actually be in one piece starting at one spool and being positioned through one set of holes 124 in the upper portion of the shade and then being sewn between the stiffener 130, 132 and 134 to then be positioned through a lower set of holes 124 to the other spool 86. Assembly procedures may also dictate that the cords be mounted in two pieces.

When using oppositely positioned right and left-hand shades 22 and 20 as shown in FIG. 1, one of the shade stiffener sections would have the hook fastener 18 sewn at 128 to the stiffener section while the oppositely positioned shade would have the loop fastener 30 so that the two fastener sections 28 and 30 would stick or fasten together around the inside mirror.

When using a single pleated shade across the entire windshield, then the hook 28 section of the fastener could be fastened to a loop section that previously had been attached to the side post 15. In the alternate, the tab 46 could be formed with a hole which would then be held by a hook attached to the side post 15 to hold the shade in an open position. Other means such as suction cups could also be used within the spirit and scope of the invention.

Referring now to FIGS. 22-26 there will be described how the applicant's novel solar radiation shade may be used elsewhere in the automotive vehicle. In FIG. 22 there is shown a representation of a side or rear window 142 of the automotive vehicle. Since the applicant's shade is designed to be closed over the front windshield 12 while the vehicle is parked, then it can also be removed from the mounting fasteners 48 while the vehicle is being operated.

A modified mounting fastener 138, similar to the mounting fastener 48 but with a suction cup 140 attached, could be used on the side or rear window 142 to hold the shade in a horizontal position as shown in FIGS. 22 and 23. FIG. 25 shows the side or rear window with the modified mounting fasteners attached thereto and the fasteners would go into the holes 72 of the lower case 52 being tightly held therein by the fastener construction as previously described when referring to FIGS. 6-9.

In this way, should the occupants of the vehicle be traveling and find that sun is reflecting into the car through a side or rear window, then the solar shade units can be simply and quickly removed from the fixed mounting fasteners 48 positioned on the front windshield near the side posts 13 and 15, and be repositioned on the suction cup mounting modified fasteners 138 that would be positioned as shown in FIG. 25. To hold the repositioned shade closed over the side window, a suction cup 148 having a flat surface 144 formed thereon could be used with a hook and loop fastener 146 attached thereto. In this manner, the suction cup 148 could be attached to the lower portion of the window and could be fastened by the hook and loop fastener 146 to the mating fastener on the stiffener end of the shade in the vicinity of the tab 46.

When constructed thusly, the applicant's novel device has convertibility for being used on any of the vehicle's windows, both whlle the vehicle is parked and while it is being operated. The novel use of the retractable pleated shade section allows the case to be mounted close to nonparallel side posts without the driver's view being obstructed and the solar reflective pleated section, on at least the outside facing portion, virtually eliminates solar reflection destruction within the automobile.

Should the vehicle be regularly parked in a manner where solar reflection come in the side windows as well as the front windshield, then additional shades can be purchased as used with the modified fasteners 138 to provide the necessary solar protection.

The preferred construction of the pleated shade would be a polyester fiber construction with a solar reflective coating on the oustide thereof. A good quality pleated shade construction used for home and office windows is manufactured by the Joanna Western Mills Company having a corporate office in Chicago, Ill. USA with other locations around the country. A mylar film coating could be used for the reflective coating and could be more opaque if desired and is generally available in gold and silver colors. The outside facing solar reflective coating could also be printed with indicia designating advertising or with a scenic picture to make the shade more eye appealing when closed across the windshield. The solar coating could also have indicia printed on the exterior facing side of the shade which would designate the make of the automobile such as BMW as is commonly used in windshield headliner attachments for its elite effect.

The inside facing portion of the applicant's shade could also be colored in grey or tan for appearance purposes and could also be colored in other colors within the spirit and scope of the invention. With the use of the removable feature of the invention, the basic shade unit could also be removed from the automotive vehicle and be used inside a home for a temporary use where needed such as on a sliding patio door or the like.

From the foregoing it can be seen that the objects and advantages of the invention have been accomplished with the applicant's invention. While the preferred embodiment has been given by way of illustration only, other constructions and modifications may be constructed within the spirit and scope of the invention.

The applicant is not to be limited to the exact embodiment shown and described.

Having described my invention, I claim:

1. An automatic retractable shade unit for positioning on the inside of an automotive vehicle windshield having upright windshield posts, the unit designed to prevent solar heat transfer through the windshield while the vehicle is non-operable and being adaptable for alternately mounting on another window of the vehicle while the vehicle is operable, if desired, comprising:
   a. at least one mounting case having positioned thereon mounting means for removably mounting the case in close proximity to one side of the automotive vehicle windshield post on the inside of the windshield,
      (1) the case containing spring bias means for biasing a movement of the shade unit when closed to return to an open position when desired;
   b. an elongated pleated shade section having opposite sides and faces and having formed thereon on at least one face thereof a solar reflective material, the solar material being positioned for solar reflection to the outside of the automotive vehicle, the shade section having:
      (1) one side of the shade section being fixedly attached to the mounting case,
      (2) retractable means having opposite ends and being positioned for movement of the pleated shade section and being fixedly attached on at least one end thereof to the spring bias means;
   c. a shade stiffener fixedly attached to the other side of the shade section,
      (1) the shade stiffener also being fixedly attached to the other end of the retractable means,
      (2) the shade stiffener also having formed thereon fastening means for removably fastening the shade stiffener to an adjacent surface when the shade is closed;
   d. the pleated shade section permitting the unit to be mounted in proximity to nonparallel windshield posts thereby allowing the bottom of the shade to expand more than the top of the shade;
   e. the mounting means permitting the shade unit to be removed from the proximity of the windshield as desired for other uses elsewhere in the vehicle during operation of the vehicle; and
   f. the fastening means permitting the shade unit to be removably fastened to the other side of the vehicle windshield post if desired and to a similar shade unit positioned on the other side of the windshield if desired and also another surface elsewhere in the vehicle as desired.

2. The shade unit as defined in claim 1 wherein the mounting means comprises at least one generally T-shaped mounting fastener having formed thereon a mounting surface for fixedly attaching the fastener to the windshield.

3. The shade unit as defined in claim 2 wherein the T-shaped mounting fastener is fixedly attached to the windshield by double-sided adhesive tape.

4. The shade unit as defined in claim 2 wherein the T-shaped mounting fastener is fixedly attached to the windshield by adhesive.

5. The shade unit as defined in claim 1 wherein the mounting means comprise at least two mounting fasteners fixedly attached to the windshield.

6. The shade unit as defined in claim 1 wherein the spring bias means comprises at least one flat coil spring positioned within a spool which is positioned within the mounting case.

7. The shade unit as defined in claim 1 wherein the spring bias means comprises at least two flat coil springs, each one positioned within a spool which is positioned within the mounting case.

8. The shade unit as defined in claim 1 wherein the retractable means comprises at least one nylon cord positioned within the pleated shade section and through a plurality of holes contained within the pleated section.

9. The shade unit as defined in claim 8 wherein the retractable means comprises at least two nylon cords.

10. The shade unit as defined in claim 8 wherein the pleated shade section is formed of a polyester fiber.

11. The shade unit as defined in claim 1 wherein the shade stiffener is formed of at least one section of flexible material.

12. The shade unit as defined in claim 1 wherein the shade stiffener is formed of at least two sections of flexible material.

13. The shade unit as defined in claim 11 further comprising at least three sections of flexible material being fixedly attached to a central portion of the stiffener.

14. The shade unit as defined in claim 1 wherein the fastening means comprises a loop and hook type fastener.

15. The shade unit as defined in claim 1 wherein the fastening means comprises a suction cup.

16. The shade unit as defined in claim 1 wherein the other side of the shade section and the shade stiffened along with the fastening means, and the other end of the retractable means are sewn together.

17. In an automotive vehicle shade unit having a top and a bottom and designed for positioning on the inside of the automotive vehicle windshield in proximity to the windshield post, and being designed to protect the inside of the vehicle from the deleterious effects of solar radiation, the improvement comprising:
   a. the shade being formed from a pleated solar reflective material having two sides, and being fixedly attached on one side to a case;
   b. the case being removably mounted on at least one side of the vehicle windshield in proximity to the windshield post and having positioned therein spring bias means and retractable means for allowing the pleated shade to be closed so that the bottom of the shade can expand more than the top of the shade to compensate for nonparallel windshield posts and for the shade to retract to an open position when desired;
   c. the shade having fixedly attached thereto fastening means to removably fasten the other side of the shade to an adjacent surface as desired; and
   d. the removable mounting of the case permitting the case with the shade attached to be used elsewhere in the vehicle during operation of the vehicle, such as positioning the shade unit on another window of the vehicle.

18. The improvement as defined in claim 17 wherein the pleated solar reflective material is formed of a polyester fiber.

19. The shade unit as defined in claim 1 wherein the retractable means comprises at least one polyester monofilament cord positioned within the pleated shade section and through a plurality of holes contained within the pleated section.

20. The shade unit as defined in claim 19 wherein the retractable means comprises at least two polyester monofilament cords.

* * * * *